(12) United States Patent
Vacondio et al.

(10) Patent No.: US 9,077,483 B2  
(45) Date of Patent: Jul. 7, 2015

(54) OPTICAL TRANSMISSION WITH POLARIZATION DIVISION MULTIPLEXING

(75) Inventors: Francesco Vacondio, Nozay (FR); Christian Simonneau, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 44 days.

(21) Appl. No.: 13/978,635

(22) PCT Filed: Feb. 16, 2012

(86) PCT No.: PCT/EP2012/052668  
§ 371 (c)(1), (2), (4) Date: Aug. 12, 2013

(87) PCT Pub. No.: WO2012/113701  
PCT Pub. Date: Aug. 30, 2012

(65) Prior Publication Data  
US 2013/0322881 A1   Dec. 5, 2013

(30) Foreign Application Priority Data  
Feb. 22, 2011   (EP) .................................... 11305185

(51) Int. Cl.  
*H04J 14/00* (2006.01)  
*H04J 14/06* (2006.01)

(52) U.S. Cl.  
CPC *H04J 14/06* (2013.01); *H04J 14/00* (2013.01)

(58) Field of Classification Search  
CPC ....... H04B 10/5053; H04J 14/06; H04J 14/00  
USPC .................................................... 398/65, 184  
See application file for complete search history.

(56) References Cited

U.S. PATENT DOCUMENTS

| | | | |
|---|---|---|---|
| 2010/0054738 A1 | 3/2010 | Yuki | |
| 2010/0150555 A1 | 6/2010 | Wang et al. | |
| 2011/0044702 A1* | 2/2011 | Mizuguchi et al. | 398/184 |
| 2013/0177316 A1* | 7/2013 | Cardakli | 398/79 |
| 2013/0279913 A1* | 10/2013 | Akiyama et al. | 398/65 |

FOREIGN PATENT DOCUMENTS

EP   2273700   1/2011

* cited by examiner

*Primary Examiner* — Leslie Pascal  
(74) *Attorney, Agent, or Firm* — Patti & Malvone Law Group, LLC

(57) ABSTRACT

A optical transmitter and method for transmitting digital data on an optical channel, performing the steps of generating first and second baseband digital signals, modulating a first polarized optical carrier wave component in accordance with the first baseband digital signal, modulating a second polarized optical carrier wave component in accordance with the second baseband digital signal, wherein the second polarized optical carrier wave component has an orthogonal polarization to the first polarized optical carrier wave component and combining the first and second modulated optical carrier wave components into a propagation medium. The first and second baseband digital signals are generated in a correlated manner so that the modulated optical carrier wave components are combined as a modulated single-polarization optical carrier wave.

10 Claims, 1 Drawing Sheet

US 9,077,483 B2

OPTICAL TRANSMISSION WITH POLARIZATION DIVISION MULTIPLEXING

CROSS REFERENCE

This application claims the benefit of European patent application No. EP 11305185.8, filed Feb. 22, 2011 and the benefit of PCT patent application No. PCT/EP2012/052668, filed Feb. 16, 2012, the respective contents of which are hereby incorporated by reference in their entirety.

FIELD OF THE INVENTION

The invention relates to the technical field of optical communication systems using polarization division multiplexing, and in particular to the transmission of optical packets or bursts.

BACKGROUND

The association of optical packet transmission with polarization division multiplexing (PDM) is receiving attention for the development of high data-rate, highly flexible communication systems. Coherent receivers have been originally designed for optical circuit connections. The convergence time of a conventional polarization demultiplexing algorithm takes typically a few thousand symbols. In packet transmission, every packet has its own state of polarization (SOP). Repeating the conventional convergence process for each and every packet would consume a large amount of the bandwidth.

EP-A-2273700 teaches methods for speeding up convergence of a polarization demultiplexing filter in a coherent receiver adapted to optical packet reception. These methods involve the generation of optical packets comprising a header section including a single-polarization optical signal and a payload section including a polarization division multiplexed optical signal. To generate such an optical packet, EP-A-2273700 teaches methods that require turning on and off the drivers of MZ modulators and changing the bias of Mach-Zehnder (MZ) modulators at a very high speed between the header section and payload section.

SUMMARY

In an embodiment, the invention provides a method for transmitting digital data on an optical channel, comprising:
generating first and second baseband digital signals,
modulating a first polarized optical carrier wave component in accordance with the first baseband digital signal,
modulating a second polarized optical carrier wave component in accordance with the second baseband digital signal, wherein the second polarized optical carrier wave component has an orthogonal state of polarization to the first polarized optical carrier wave component and combining the first and second modulated optical carrier wave components into a propagation medium,
wherein the first and second baseband digital signals are generated in a correlated manner, so that the modulated optical carrier wave components are combined as a modulated single-polarization optical carrier wave.

According to embodiments, such a method may comprise one or more of the features below:
the first and second baseband digital signals are equal or opposite.
the first polarized optical carrier wave component and the second polarized optical carrier wave component have a linear polarization state and the resulting single-polarization optical carrier wave also has a linear polarization state. Alternatively, the polarized optical carrier wave components may have other states of polarization, e.g. circular.
the polarized optical carrier wave components are phase-modulated.
the phase modulation is a QPSK modulation.
the modulating is performed with Mach-Zehnder modulators.

In an embodiment, the invention also provides a method for generating an optical packet on an optical channel, the optical packet comprising a header section including a single-polarization optical signal and a payload section including a polarization division multiplexed optical signal, the method comprising:
generating the single-polarization optical signal of the header section with the above method, wherein first portions of the first and second baseband digital signals are generated in a correlated manner to obtain the single-polarization optical signal of the header section, and
generating second portions of the first and second baseband digital signals in an essentially uncorrelated manner to obtain the polarization division multiplexed optical signal of the payload section.

In an embodiment, the method further comprises changing an operating mode of a baseband signal generation module between the generating of the header section and the generating of the payload section.

In an embodiment, the method further comprises generating a second single-polarization optical signal of the header section with a similar method, wherein third portions of the first and second baseband digital signals are generated in a correlated manner with a different correlation from the first portions of the baseband digital signals, so as to obtain the second single-polarization optical signal of the header section in a polarization state orthogonal to the polarization state of the first single-polarization optical signal of the header section.

In an embodiment, the invention also provides a optical transmitter for generating polarization division multiplexed optical signals, comprising:
a baseband signal generation module for generating first and second baseband digital signals,
a first modulator for modulating a first polarized optical carrier wave component in accordance with the first baseband digital signal
a second modulator for modulating a second polarized optical carrier wave component in accordance with the second baseband digital signal, wherein the second polarized optical carrier wave component has an orthogonal polarization to the first polarized optical carrier wave component, and
an optical combiner for combining the first and second modulated optical carrier wave components into a propagation medium,
wherein the baseband signal generation module is adapted to operate in first and second operating modes,
wherein the baseband signal generation module in the first operating mode generates the first and second baseband digital signals in a correlated manner so that the modulated optical carrier wave components are combined as a modulated single-polarization optical carrier wave in the propagation medium and,
wherein the baseband signal generation module in the second operating mode generates the first and second baseband digital signals in an essentially uncorrelated manner so that the modulated optical carrier wave components are combined as a polarization division multiplexed optical signal.

In an embodiment, the optical transmitter further comprises a packet forming module for forming the first and second polarized optical carrier wave components as an optical packet.

In an embodiment, the invention also provides a optical transmitter for generating polarization division multiplexed optical signals, comprising:

a baseband signal generation module for generating first and second baseband digital signals, a first modulator for modulating a first polarized optical carrier wave component in accordance with the first baseband digital signal a second modulator for modulating a second polarized optical carrier wave component in accordance with the second baseband digital signal, wherein the second polarized optical carrier wave component has an orthogonal polarization to the first polarized optical carrier wave component, and an optical combiner for combining the first and second modulated optical carrier wave components into a propagation medium, a first optical gate selectively operable in a passing state for passing the first polarized optical carrier wave component to the optical combiner or in a blocking state for blocking the first polarized optical carrier wave component, and a gating controller adapted to switch the first optical gate between the blocking state and the passing state to obtain a transmitted optical signal in the propagation medium selected in the group consisting of the second polarized optical carrier wave component alone and the combination of the first and second polarized optical carrier wave components.

According to embodiments, such an optical transmitter can comprise one or more of the features below:

a second optical gate selectively operable in a passing state for passing the second polarized optical carrier wave component to the optical combiner or in a blocking state for blocking the second polarized optical carrier wave component, wherein the gating controller is adapted to also switch the second optical gate between the blocking state and the passing state to obtain a transmitted optical signal in the propagation medium selected in the group consisting of the first polarized optical carrier wave component alone, the second polarized optical carrier wave component alone and the combination of the first and second polarized optical carrier wave components.

the gating controller is adapted to switch the optical gates so as to form an optical packet comprising a header section including a single-polarization optical signal and a payload section including a polarization division multiplexed optical signal.

the or each optical gate comprises a semiconductor optical amplifier.

Aspects of the invention stem for the observation that changing the bias of MZ modulators at a high-speed may generate undesirable transients likely to impose severe limitations on the quality of the modulated optical signals.

Aspects of the invention are based on the idea of operating PDM optical transmitters to selectively generate single-polarization or dual-polarization optical signals without changing the bias of MZ modulators.

BRIEF DESCRIPTION OF THE DRAWINGS

These and other aspects of the invention will be apparent from and elucidated with reference to the embodiments described hereinafter, by way of example, with reference to the drawings.

DETAILED DESCRIPTION OF THE EMBODIMENTS

Figure 1:
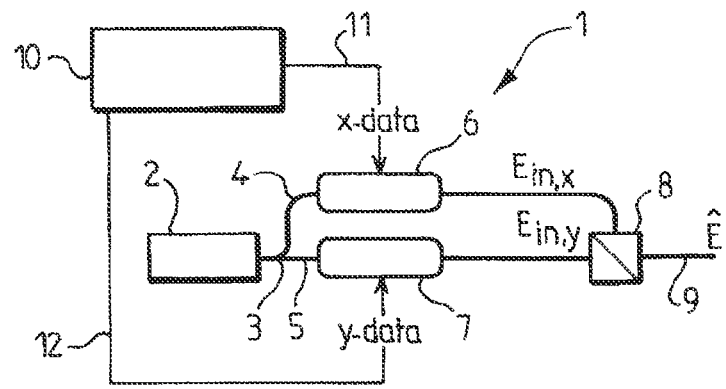
FIG. 1 is a functional representation of PDM optical transmitter in accordance with a first embodiment.

With reference to FIG. 1, an optical transmitter 1 adapted to generate a PDM optical signal is schematically shown. Transmitter 1 comprises a laser source 2 to generate an optical carrier wave at a selected wavelength suitable for WDM transmissions. A beam splitter 3 splits the optical carrier wave into two carrier wave components propagating in respective waveguides 4 and 5. A respective optical modulator 6 and 7 is arranged on each of the waveguides 4 and 5 to impart a modulation on the corresponding carrier wave component as a function of respective baseband signals 11 and 12, which are generated by a baseband signal generator 10 at the same data-rate. Optical modulators 6 and 7 may be any type of modulators. In a preferred embodiment, optical modulators 6 and 7 are MZ modulator arrangements adapted to generate PSK modulations, e.g. Binary Phase-Shift Keying or Quaternary Phase Shift Keying. Such arrangements are known in the art. In particular, the baseband signals 11 and 12 may comprise NRZ-coded signals driving MZ modulators so that each signal transition causes a 90° or 180° phase-shift in a corresponding carrier wave component.

At the output of waveguides 4 and 5, a polarization beam combiner 8 selects an x-polarized component of the modulated carrier wave component coming from waveguide 4 and a y-polarized component of the modulated carrier wave component coming from waveguide 5 and superposes both polarized components into an output waveguide 9, e.g. an optical fiber connected to a communications network. As used herein, x and y refer to two orthogonal states of polarization defined by the physical structure of the polarization beam combiner 8, as known in the art.

In FIG. 1, the modulated carrier wave component coming from waveguide 4 is denoted by $E_{in,x}$ and the corresponding baseband signal 11 is denoted by x-data. In FIG. 1, the modulated carrier wave component coming from waveguide 5 is denoted by $E_{in,y}$ and the corresponding baseband signal 12 is denoted by y-data.

As a result, the optical signal $\hat{E}$ transmitted in the output waveguide 9 can be expressed as:

$$\hat{E} = \hat{E}_{in,x}\hat{x} + E_{in,y}\hat{y}, \quad (1)$$

where ^ denote a vector.

In ordinary PDM transmissions, this principle is used to transfer essentially independent streams of data on the respective field components $E_{in,x}$ and $E_{in,y}$ so as to substantially double the data-rate compared to a single-polarization transmission at the same baseband rate. As a result, the SOP of the output optical signal $\hat{E}$ keeps changing and the instantaneous SOP depends on the data-streams x-data and y-data at any given instant.

However, it is observed that when the data-streams are equal, Eq. (1) can be rewritten:

$$\hat{E} = E_{in,x}(\hat{x}|\hat{y}), \quad (2)$$

i.e. the SOP of the output signal $\hat{E}$ is constant and the output signal $\hat{E}$ is a linearly polarized field along direction $\hat{x}+\hat{y}$.

In the same manner, it is observed that when the data-streams are mutually opposite, Eq. (1) can be rewritten:

$$\hat{E}=E_{in,x}(\hat{x}-\hat{y}),\quad(3)$$

i.e. the SOP of the output signal $\hat{E}$ is constant and the output signal $\hat{E}$ is a linearly polarized field along direction $\hat{x}-\hat{y}$.

Therefore, it is observed that optical transmitter 10 can be operated to generate a single polarization signal along direction $\hat{x}+\hat{y}$ or a single polarization signal along direction $\hat{x}-\hat{y}$ or a dual-polarization optical signal just by changing the binary content of the baseband signals 11 and 12 without modifying the operating point of the modulators 6 and 7.

The above principle can be exploited to generate optical packets having a PDM payload preceded by a single-polarization header intended to speed-up convergence of a polarization demultiplexing filter in a coherent receiver, as known in the art. The packet header may include one single-polarization section or two different single-polarization sections having orthogonal SOPs. In addition, a PDM header section can be added to refine filter convergence at the receiver before the payload is received. An embodiment of such a packet header 20 with three sections is schematically shown on FIG. 2 as a function of time.

Figure 2:
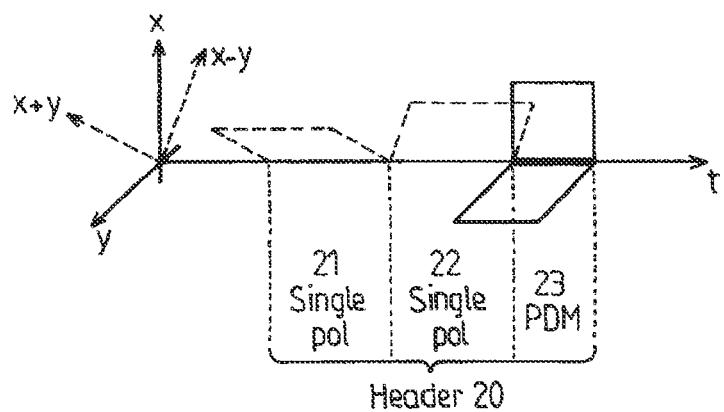
FIG. 2 is a schematic representation of an optical packet that can be obtained with the transmitter of FIG. 1.

In FIG. 2, header section 21 comprises a linearly polarized field along direction $\hat{x}+\hat{y}$, header section 22 comprises a linearly polarized field along direction $\hat{x}-\hat{y}$, whereas 23 denotes a PDM header section. Alternatively, PDM section 23 can be a packet payload. It will be appreciated that the only operation required in the transmitter 10 between each subsequent header section or between the packet header and packet payload amounts to changing the binary content of baseband signals 11 and 12. Such change is made in the electrical domain and can be performed at a very high speed without creating impairments in the optical signal. In addition, by superimposing both correlated field components, it will be appreciated that a resulting output power and OSNR are improved compared to a single field component.

To generate the optical signal $\hat{E}$ in the form of optical packets, optical transmitter 10 may comprise a packet shaper (not shown) in the form of a semiconductor optical amplifier (SOA) or other optical gate arranged within laser source 2, between laser source 2 and beam splitter 3 or at any other suitable location.

Figure 3:
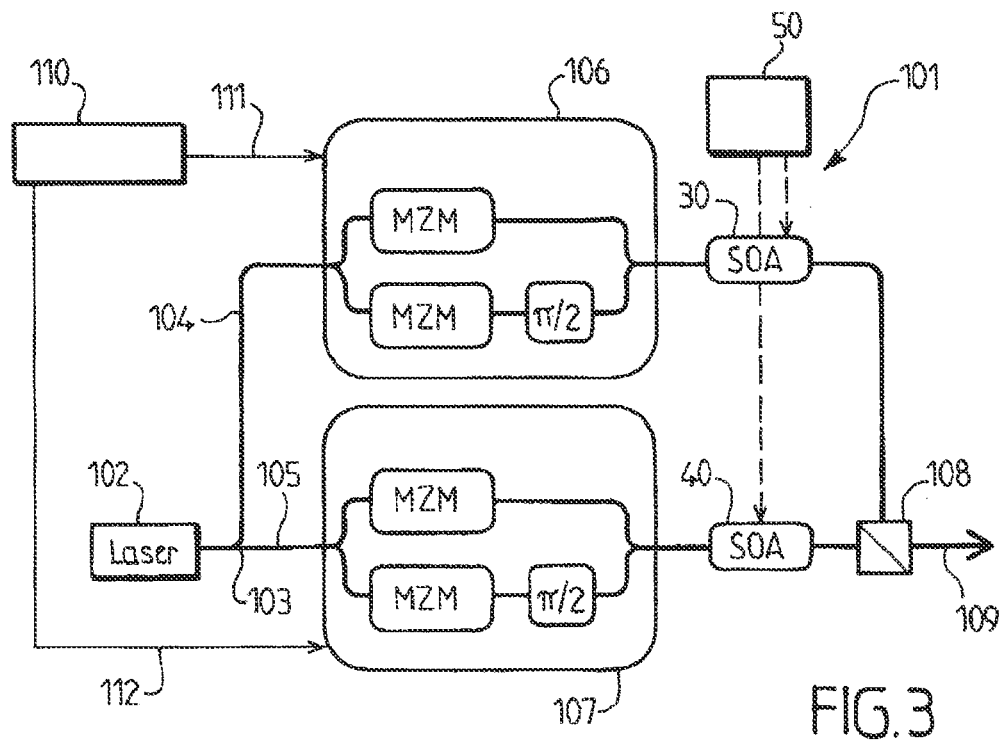
FIG. 3 is a functional representation of PDM optical transmitter in accordance with a second embodiment.

Turning now to FIG. 3, there is shown another embodiment of an optical transmitter 101 adapted to selectively generate single-polarization and dual-polarization signals, in particular in the form of optical packets. Elements which are similar or identical to the embodiment of FIG. 1 are designated by the same numeral increased by 100.

In the transmitter 101, SOAs 30 and 40 are mounted on the waveguides 104 and 105 respectively. Each SOA 30 and 40 is operated as an optical gate under the control of a gating controller 50 to selectively extinguish the corresponding carrier wave component or pass it to the polarization beam combiner 108.

To generate an optical packet having a similar structure to that of FIG. 2, the gating controller 50 controls the switching state of the SOAs as follows:

For the first header section 21, SOA 40 is in the blocking state and SOA 30 is in the passing state. The resulting first header section 21 is now polarized along direction $\hat{x}$ instead of $\hat{x}+\hat{y}$. In this header section, it is only necessary to generate baseband signal 111, whereas baseband signal 112 is obviously unnecessary and ineffective.

For the second header section 22, SOA 30 is in the blocking state and SOA 40 is in the passing state. The resulting second header section 22 is now polarized along direction $\hat{y}$ instead of $\hat{x}-\hat{y}$. In this header section, it is only necessary to generate baseband signal 112, whereas baseband signal 111 is obviously unnecessary and ineffective.

For the third header section 23 and/or payload, SOAs 30 and 40 are both in the passing state.

To terminate the current optical packet and create a guard band before a subsequent optical packet, SOAs 30 and 40 are both switched in the blocking state.

Alternatively, optical gates other than SOAs can be arranged and controlled in the same manner as SOAs 30 and 40, such as silicon photonics optical gates.

In the example shown, the modulators 106 and 107 are QPSK modulators comprising two arms, an MZ modulator in each arm and a 90°-phase shift in the lower arm. Other types of modulators can be used in the same manner.

In PDM transmissions, x-data and y-data are generated as independent data streams that do not have a long-lasting correlation. However, coding techniques and protocol functions can create temporary correlations between signals, i.e. as a result of redundancy coding, frame retransmissions, etc.

Elements such as the control units and signal generation modules could be e.g. hardware means like e.g. an ASIC, or a combination of hardware and software means, e.g. an ASIC and an FPGA, or at least one microprocessor and at least one memory with software modules located therein.

The invention is not limited to the described embodiments. The appended claims are to be construed as embodying all modification and alternative constructions that may be occurred to one skilled in the art, which fairly fall within the basic teaching here, set forth.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps.

In the claims, any reference signs placed between parentheses shall not be construed as limiting the scope of the claims.

The invention claimed is:

1. A method for transmitting digital data on an optical channel, comprising:
    generating first and second baseband digital signals;
    modulating a first polarized optical carrier wave component in accordance with the first baseband digital signal;
    modulating a second polarized optical carrier wave component in accordance with the second baseband digital signal, wherein the second polarized optical carrier wave component has an orthogonal state of polarization to the first polarized optical carrier wave component; and
    combining the first and second modulated optical carrier wave components into a propagation medium;
    wherein the first and second baseband digital signals are generated in a correlated manner, so that the modulated optical carrier wave components are combined as a modulated single-polarization optical carrier wave having a constant State-Of-Polarization, wherein the first and second baseband digital signals are equal or opposite.

2. A method in accordance with claim 1, wherein the first polarized optical carrier wave component and the second polarized optical carrier wave component have a linear polarization state and the resulting single-polarization optical carrier wave also has a linear polarization state.

3. A method in accordance with claim 1, wherein the polarized optical carrier wave components are phase-modulated.

4. A method in accordance with claim 3, wherein the phase modulation is a QPSK modulation.

5. A method in accordance with claim 1, wherein the modulating is performed with Mach-Zehnder modulators.

6. A method for generating an optical packet on an optical channel, the optical packet comprising a header section including a single-polarization optical signal and a payload section including a polarization division multiplexed optical signal, the method comprising:
generating the single-polarization optical signal of the header section with a method comprising the steps of:
generating first and second baseband digital signals;
modulating a first polarized optical carrier wave component in accordance with the first baseband digital signal;
modulating a second polarized optical carrier wave component in accordance with the second baseband digital signal, wherein the second polarized optical carrier wave component has an orthogonal state of polarization to the first polarized optical carrier wave component; and
combining the first and second modulated optical carrier wave components into a propagation medium;
wherein first portions of the first and second baseband digital signals are generated in a correlated manner to obtain the single-polarization optical signal of the header section having a constant State-Of-Polarization; and
generating second portions of the first and second baseband digital signals in an essentially uncorrelated manner to obtain the polarization division multiplexed optical signal of the payload section having a data-dependently varying State-Of-Polarization;
wherein the first and second baseband digital signals are equal or opposite.

7. A method in accordance with claim 6, further comprising changing an operating mode of a baseband signal generation module between the generating of the header section and the generating of the payload section.

8. A method in accordance with claim 6, further comprising generating a second single-polarization optical signal of the header section, wherein third portions of the first and second baseband digital signals are generated in a correlated manner with a different correlation from the first portions of the baseband digital signals, so as to obtain the second single-polarization optical signal of the header section in a constant State-Of-Polarization orthogonal to the constant State-Of-Polarization of the first single-polarization optical signal of the header section.

9. An optical transmitter for generating polarization division multiplexed optical signals, comprising:
a baseband signal generation module for generating first and second baseband digital signals;
a first modulator for modulating a first polarized optical carrier wave component in accordance with the first baseband digital signal;
a second modulator for modulating a second polarized optical carrier wave component in accordance with the second baseband digital signal, wherein the second polarized optical carrier wave component has an orthogonal polarization to the first polarized optical carrier wave component; and
an optical combiner for combining the first and second modulated optical carrier wave components into a propagation medium;
wherein the baseband signal generation module is adapted to operate in first and second operating modes,
wherein the baseband signal generation module in the first operating mode generates the first and second baseband digital signals in a correlated manner so that the modulated optical carrier wave components are combined as a modulated single-polarization optical carrier wave having a constant State-Of-Polarization in the propagation medium; and
wherein the baseband signal generation module in the second operating mode generates the first and second baseband digital signals in an essentially uncorrelated manner so that the modulated optical carrier wave components are combined as a polarization division multiplexed optical signal having a data-dependently varying State-Of-Polarization;
wherein the first and second baseband digital signals are equal or opposite.

10. An optical transmitter in accordance with claim 9, further comprising a packet forming module for forming the first and second polarized optical carrier wave components as an optical packet.

* * * * *